UNITED STATES PATENT OFFICE.

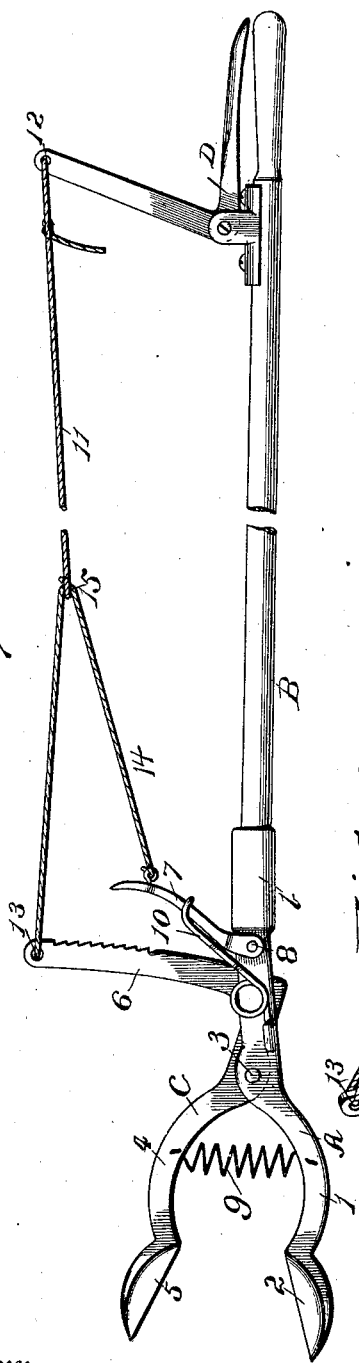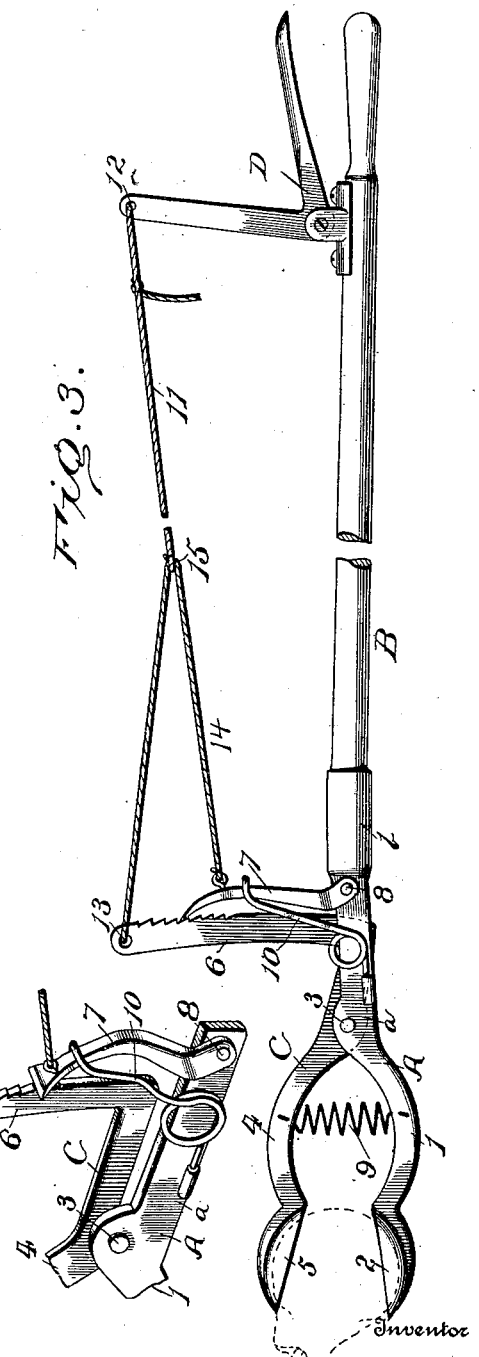

WALLACE A. TRIMBLE, OF QUINCY, ILLINOIS.

FRUIT-GATHERER.

SPECIFICATION forming part of Letters Patent No. 673,306, dated April 30, 1901.

Application filed October 29, 1900. Serial No. 34,796. (No model.)

*To all whom it may concern:*

Be it known that I, WALLACE A. TRIMBLE, a citizen of the United States of America, residing at Quincy, in the county of Adams and State of Illinois, have invented certain new and useful Improvements in Fruit-Gatherers, of which the following is a specification.

My invention relates to an improvement in fruit-gatherers; and the object of the invention, as the name implies, is to provide a simple, inexpensive, and effectual appliance for picking and holding fruit until it can be lowered to a suitable receptacle for its reception.

The invention consists in certain novel features of construction and combinations of parts, which will be hereinafter described, and pointed out in the claims.

In the accompanying drawings, Figure 1 is a view in perspective of my improved fruit-gatherer, showing the jaws open to receive the fruit. Fig. 2 is an enlarged detail view; and Fig. 3 is a view similar to Fig. 1, except that the jaws are shown locked upon the fruit, the latter being indicated in dotted lines.

A represents the rigid jaw. This comprises a shank $a$ and a socket $b$, or it might be a tang, for the attachment of the device to the pole or handle B. From the outer end of the shank the material of which the part is made is preferably bowed outward, as at 1, and at the extreme outer end of this bowed portion 1 a cup 2 is formed.

The movable jaw C is pivoted at 3 to the shank of the rigid jaw and from this point bowed outwardly, as at 4, in a corresponding fashion to the bowed or curved portion 1 of the rigid jaw and extending opposite thereto, and the outer end of this bowed or curved arm is furnished with a cup 5, which corresponds to the cup 2, previously described, the two coöperating to receive and hold the fruit to be picked between them. The inner end of the pivoted jaw is provided with a ratchet-toothed segment 6, and a pawl 7, pivoted at 8 to the rigid jaw, operates, in connection with these teeth, to lock the cup of the pivoted jaw after the cups have adjusted themselves to the fruit to be picked, the stiff spiral spring 9 holding said cups yieldingly upon the fruit and drawing them together or toward each other normally. A spring 10, secured to the rigid jaw, has sliding connection with the pawl, thus normally swinging it toward and holding the pawl in engagement with the teeth of the segment. In this manner not only are the cups pulled toward each other or upon the fruit to be picked, but also the pivoted jaw when the cup carried by it is adjusted to the fruit becomes automatically locked upon the fruit, where it remains securely until released, which action is left with the discretion of the operator. Thus it will be seen that the cups are not only automatically locked, but that they likewise adjust themselves automatically to the size of the fruit being picked, whether it be apples, pears, peaches, oranges, lemons, or anything of that nature.

The pivoted jaw is operated and controlled by a hand-lever D. This hand-lever is approximately L-shaped and pivoted at the angle to the pole or handle within reach of the operator, one end being adapted for manipulation by the operator and the other end serving as a lever to operate the movable jaw and the pawl which controls it. A connecting device in the shape of a cord 11 extends from the outer end of this lever, it being passed through an eyelet 12, formed therefor, to the outer end of the segment, where it is secured in an eyelet 13, arranged for that purpose. A branch cord 14, secured to the main cord, extends to the pawl. As a convenient means for adjusting the length of the branch cord and the portion attached to the outer end of the segment these two ends may consist of a single cord, as indicated, having a loop connection at point 15 with the main cord 11. This latter construction is desirable, because it is sometimes necessary to readjust the connection when the device is operating with different sizes of fruit. Also the lower end of the cord 11 is capable of adjustment at its point of connection with the L-shaped lever.

In operation the pole or handle is held by the operator in his two hands as may be most convenient for him—as, for instance, the lower end in his right hand and some portion of the pole higher up in his left hand. The rigid jaw is then placed in position beneath the fruit to be picked, the other jaw having previously been swung open by depressing the hand-lever D. The movable jaw is then allowed to close upon the fruit by releasing the hand-lever, the spiral spring causing the movable jaw to swing inward. When the cups become properly adjusted to the fruit, the pawl engages the teeth on the segment and locks the jaws together. The same slack which allows the movable jaw to come under the influence of the spiral spring also permits the spring connected with the pawl to throw the pawl into engagement with the ratchet-teeth. When thus engaged, the operator lowers the pole, and to drop the fruit into a receptacle he again pulls the hand-lever inward, thereby removing the pawl from its engagement with the ratchet-teeth and swinging open the movable jaw.

Of course it is understood that the size and dimension of the parts, the length of the pole, and the material used may be varied and that other slight changes may be resorted to in the form and arrangement of the several parts described without departing from the spirit and scope of my invention, and hence I do not wish to limit myself to the exact construction herein set forth; but,

Having thus fully described my invention, what I claim as new, and desire to secure by Letters Patent, is—

1. In a fruit-gatherer, the combination with a pole having a pair of jaws connected therewith, one jaw being movable and having a toothed segment thereon, each jaw provided with a cup to receive and grasp the fruit, of an operating-lever, a pawl and means extending from the operating-lever to the movable jaw and pawl whereby to first remove the pawl and then swing the movable jaw.

2. The combination with a pair of jaws pivotally connected together, and means for opening and closing them, of means pivotally connected with one jaw and adapted to engage the other to automatically lock the jaws upon the fruit the moment they are permitted to close upon the fruit said locking means controlled by the same means which controls the jaws.

3. The combination with a pair of jaws pivotally connected, one jaw having a toothed segment thereon, of a pawl adapted to engage the teeth of the segment and automatically lock the jaws when they have adjusted themselves to the fruit to be grasped said pawl controlled by the same means which controls the jaw having the segment.

4. The combination with a pair of jaws pivotally connected together and spring-actuated, a pawl pivotally connected to one and adapted to lock the other and a pole, of a hand-lever pivoted to the pole, a cord extending part way from the hand-lever to the movable jaw and a cord adjustably secured thereto, one end of said cord shorter than the other, the shorter end secured to the pawl and the longer end to the pivoted jaw, so that a pull upon the cords first acts to release the pawl and then to operate the jaw.

5. The combination with a pair of jaws, one having a segment which extends outwardly therefrom, of a pawl adapted to engage and lock said segment and connected jaw-spring for actuating the jaws and pawl in one direction, and means connected with the segment and to the pawl for controlling the pawl and jaws.

In testimony whereof I have signed my name to this specification in the presence of two subscribing witnesses.

WALLACE A. TRIMBLE.

Witnesses:
F. M. McCANN,
BERTHA M. FECHTELER.